(12) United States Patent
Kaul et al.

(10) Patent No.: US 7,668,822 B2
(45) Date of Patent: Feb. 23, 2010

(54) METHOD FOR ASSIGNING QUALITY SCORES TO DOCUMENTS IN A LINKED DATABASE

(75) Inventors: Rohit Kaul, Palo Alto, CA (US); Yeogirl Yun, Mountain View, CA (US); Seong-Gon Kim, Starkville, MS (US)

(73) Assignee: Become, Inc., Mountain View, CA (US)

( * ) Notice: Subject to any disclaimer, the term of this patent is extended or adjusted under 35 U.S.C. 154(b) by 226 days.

(21) Appl. No.: 11/523,361

(22) Filed: Sep. 18, 2006

(65) Prior Publication Data

US 2007/0016579 A1    Jan. 18, 2007

Related U.S. Application Data

(63) Continuation-in-part of application No. 11/318,193, filed on Dec. 23, 2005.

(60) Provisional application No. 60/638,952, filed on Dec. 23, 2004.

(51) Int. Cl.
G06F 7/00 (2006.01)
G06F 17/30 (2006.01)
(52) U.S. Cl. ............... 707/5; 709/217; 709/218
(58) Field of Classification Search ............... None
See application file for complete search history.

(56) References Cited

U.S. PATENT DOCUMENTS

| | | | |
|---|---|---|---|
| 4,953,106 A | 8/1990 | Gansner et al. | |
| 5,450,535 A | 9/1995 | North | |
| 5,748,954 A | 5/1998 | Mauldin | |
| 5,832,494 A | 11/1998 | Egger et al. | |
| 5,946,489 A | 8/1999 | Yellin et al. | |
| 6,014,678 A | 1/2000 | Inoue et al. | |
| 6,112,202 A | 8/2000 | Kleinberg | |
| 6,112,203 A | 8/2000 | Bharat et al. | |
| 6,269,368 B1 * | 7/2001 | Diamond | 707/6 |
| 6,285,999 B1 | 9/2001 | Page | |
| 6,321,220 B1 | 11/2001 | Dean et al. | |
| 6,356,899 B1 | 3/2002 | Chakrabarti et al. | |
| 6,560,600 B1 | 5/2003 | Broder | |
| 6,629,092 B1 | 9/2003 | Berke | |
| 6,738,678 B1 | 5/2004 | Bharat et al. | |
| 6,751,612 B1 | 6/2004 | Schuetze et al. | |

(Continued)

OTHER PUBLICATIONS

K. Bharat et al., "Hilltop: A Search Engine based on Expert Documents," located at http://www.cs.toronto.edu/~georgem/hilltop/.

(Continued)

*Primary Examiner*—Mohammad Ali
*Assistant Examiner*—Angelica Ruiz
(74) *Attorney, Agent, or Firm*—Carr & Ferrell LLP

(57) ABSTRACT

Exemplary methods for assigning relative rank values to a plurality of linked documents are provided. In one embodiment, the method comprises constructing or modeling a nodal network according to a connectivity graph of a linked database and determining conductance of inter-nodal links based on a link structure of the nodal network and rank values of end-nodes. The method may further comprise computing rank values of nodes in the nodal network through an iterative process, and obtaining quality scores for documents from the rank values of the nodes. The method may also include obtaining the quality scores for groups of documents.

20 Claims, 5 Drawing Sheets

U.S. PATENT DOCUMENTS

| | | | |
|---|---|---|---|
| 6,792,419 | B1 | 9/2004 | Raghavan |
| 6,799,176 | B1 | 9/2004 | Page |
| 6,871,202 | B2 | 3/2005 | Broder |
| 6,920,426 | B2 | 7/2005 | Takechi |
| 7,251,689 | B2 * | 7/2007 | Wesley ........................ 709/224 |
| 7,281,005 | B2 | 10/2007 | Canright et al. |
| 2002/0065857 | A1 | 5/2002 | Michalewicz et al. |
| 2002/0129014 | A1 | 9/2002 | Kim et al. |
| 2002/0169770 | A1 | 11/2002 | Kim et al. |
| 2002/0188527 | A1 * | 12/2002 | Dillard et al. .................. 705/27 |
| 2003/0031123 | A1 * | 2/2003 | Gilmour et al. ............. 370/216 |
| 2003/0117434 | A1 | 6/2003 | Hugh |
| 2003/0208482 | A1 | 11/2003 | Kim et al. |
| 2004/0068697 | A1 * | 4/2004 | Harik et al. ................. 715/513 |
| 2004/0098390 | A1 * | 5/2004 | Bayliss et al. ................... 707/7 |
| 2005/0060297 | A1 | 3/2005 | Najork |
| 2005/0086260 | A1 * | 4/2005 | Canright et al. .......... 707/104.1 |
| 2005/0086384 | A1 * | 4/2005 | Ernst .......................... 709/248 |
| 2006/0004809 | A1 | 1/2006 | Zhang et al. |
| 2006/0036598 | A1 | 2/2006 | Wu |
| 2006/0059119 | A1 * | 3/2006 | Canright et al. ................. 707/3 |
| 2006/0242564 | A1 * | 10/2006 | Egger et al. ................. 715/513 |

OTHER PUBLICATIONS

J. Kleinberg, "Authoritative Sources in a Hyperlinked Environment," Journal of the ACM, vol. 46, No. 5, Sep. 1999, pp. 604-632.

S. Chakrabarti et al., "Automatic Resource Compilation by Analyzing Hyperlink Structure and Associated Text," In the Proceedings of the 7th World-Wide Web Conference, 1998, located at http://decweb.ethz.ch/WWW7/1898/com1898.htm.

S. Chakrabarti et al., "Focused crawling: a new approach to topic-specific Web resource discovery," In the Proceedings of the 8th World-Wide Web Conference, Toronto, May 1999 (Published by Elsevier Science B.V., 1999).

K. Bharat et al., "Improved Algorithms for Topic Distillation in a Hyperlinked Environment," In the Proceedings of the 21st ACM SIGIR Conference on Research and Development in Information Retrieval, vol. 21, ACM, 1998, located at ftp://ftp.digital.com/pub/DEC/SRC/publications/monika/sigir98.pdf.

S. Brin et al., "The Anatomy of a Large-Scale Hypertextual Web Search Engine," In WWW Conference, vol. 7, 1998, located at http://www7.scu.edu.au/programme/fullpapers/1921/com1921.htm.

J. Carriere et al., "Web Query: Searching and Visualizing the Web through Connectivity," Computer Networks and ISDN Systems 29, 1997, pp. 1257-1267, located at http://www.cgl.uwaterloo.ca/Projects/Vanish/webquery-1.html.

Z. Wang et al., "Prefetching in World Wide Web," IEEE 1996, pp. 28-32.

C. Boyle et al., "To link or not to link: An empirical comparison of Hypertext linking strategies," ACM 1992, pp. 221-231.

E. Garfield, "Citation Analysis as a Tool in Journal Evaluation," Essays of an Information Scientist, vol. 1, pp. 527-544, 1962-73 (Reprinted from Science, vol. 178, pp. 471-479, 1972).

N. Geller, "On the citation influence methodology of Pinski and Narin," Information Processing & Management, vol. 14, 1978, Pergamon Press Ltd., Great Britain, pp. 93-95.

P. Doreian, "Measuring the relative standing of disciplinary journals," Information Processing & Management, vol. 24, No. 1, 1988, Pergamon Journals Ltd., Great Britain, pp. 45-56.

P. Doreian, "A measure of standing for citation networks within a wider environment," Information Processing & Management, vol. 30, No. 1, 1994, Pergamon Press Ltd., Great Britain, pp. 21-31.

Botafogo et al., "Structural Analysis of Hypertext: Identifying Hierarchies and Useful Metrics," ACM Transactions in Information Systems, vol. 10, No. 2, Apr. 1992, pp. 142-180.

M. Frisse, "Searching for Information in a Hypertext Medical Handbook," Hypertext '87 Papers, Nov. 1987, pp. 57-66.

M. Marchiori, "The Quest for Correct Information on the Web: Hyper Search Engines," 1997, Computer Networks and ISDN Systems, vol. 29, No. 8-13, located at http://www.w3.org/People/Massimo/papers/WWW6/.

O. McBryan, "GENVL and WWWW: Tools for Taming the Web," In the Proceedings of the First International World Wide Web Conference, ed. O. Nierstrasz, CERN, Geneva, May 1994.

A. Arocena et al., "Applications of a Web Query Language," 1997, Computer Networks and ISDN Systems, vol. 29, No. 8-13, pp. 1305-1316, located at http://www.cs.toronto.edu/~websql/www-conf/wsqp/PAPER267.html.

M. Henzinger et al., "Measuring Index Quality Using Random Walks on the Web," 1999, in the Proceedings of the 8th International World Wide Web Conference, Toronto, Canada, pp. 213-225, located at http://www8.org/w8-papers/2c-search-discover/measuring/measuring.html.

* cited by examiner

METHOD FOR ASSIGNING QUALITY SCORES TO DOCUMENTS IN A LINKED DATABASE

CROSS REFERENCE TO RELATED APPLICATIONS

The present application is a continuation-in-part application claiming the priority benefit of U.S. patent application Ser. No. 11/318,193 filed on Dec. 23, 2005 and entitled "Method for Assigning Relative Quality Scores to a Collection of Linked Documents," which claims the benefit of U.S. Provisional Patent Application No. 60/638,952 filed Dec. 23, 2004 and entitled "Web Affinity Index Ranking System," both of which are herein incorporated by reference.

FIELD OF THE INVENTION

Embodiments of the present invention relate generally to information searching, and more particularly to search engines.

RELATED ART

The World Wide Web (Web) is a rapidly growing part of the Internet. One group estimates that, as of the beginning of 2000, the Web grows more than seven million web pages each day, adding to an already enormous body of information. Because of the Web's rapid growth and lack of central organization, however, millions of users cannot find specific information in an efficient manner. Over the last decade, Internet search engines, such as the BECOME.com search engine, has become some of the most important means of information retrieval on the Internet indexing over billions of web pages.

As search engines increase their coverage, however, they exacerbate an existing problem. Typically, search engines pull up all documents (e.g., web pages) meeting search criteria. This can overwhelm a searcher with millions of irrelevant documents. Once search results are received, the searcher must review them one document at a time to find the relevant documents. Even if the searcher can download many documents, average searchers are not always willing to review more than a first page of a search result display. Therefore, it is important to present most relevant documents to the searchers at a top of the list (e.g., in first ten results).

Because millions of documents may outwardly match the search criteria, major search engines have a ranking algorithm that ranks high those documents having certain keywords in certain locations, such as a title, meta-tags, or at a beginning of a document. This does riot, however, typically put the most relevant document at the top of the list much less assess importance of the document relative to other documents.

Moreover, relying solely on the content of the document itself—including the meta-tags that do not appear when displayed—to rank the document can be a major problem to a search engine. A web author can repeat "hot" keywords many times, as a practice called spamming (e.g., in the title or meta-tags) to artificially inflate the relevance of a given document. Therefore, most Internet search engines in operation today use one of variations of a link structure analysis. PageRank algorithm used by Google, for example, has been proven to be an effective measure against the conventional keyword-based spamming techniques.

Recently, however, even PageRank has been found to be susceptible to a new generation of more sophisticated spamming techniques that manipulate the link structure of the Web. Over the years, webmasters and so-called "search engine optimization engineers" have learned how PageRank operates and have figured out ways to manipulate its algorithm. One such technique is called "Google bombing" and has given Google many cases of unwanted publicity.

Another less known, yet potentially more damaging technique is called an "artificial Web." With a moderate investment, spammers can purchase a few IP addresses and large amount of disk storage spaces. The spammers can easily write scripts to generate millions or even billions of simple Web pages that contain links to a few web sites to be promoted. As a number of these artificial web pages can be comparable to that of a major portion of the real Web, the spammers can wield undue influence in manipulating the link structure of the entire Web, thereby affecting the computation of PageRank or other link structure analysis algorithms.

Vulnerability to the artificial Web reveals fundamental limitations of conventional link analysis algorithms such as PageRank. One of the main reasons for this shortcoming is that these algorithms count all documents equally. A homepage of Yahoo.com is counted as one document just as a homepage of an obscure website maintained by a fourth-grader. This makes it possible for an artificial Web to siphon out a substantial quantity of weights from the real Web. Therefore, there is a need for a method for determining relative rank of web pages with respect to one another that is not susceptible to highly sophisticated spamming techniques.

SUMMARY OF THE INVENTION

Embodiments of the present invention relate generally to a method for assigning relative quality score values to a collection of linked documents, such as web pages in the World Wide Web. In exemplary embodiments, a fixed amount of quality points flows in a modeled nodal network according to a connectivity graph of a linked database under consideration. The nodal network is constructed by adding one node for each document in the collection and one link for each hyperlink between two documents in the collection. A link in the nodal network allows the quality points to flow only in one direction. Furthermore, the nodal network contains an extra node designated as a reservoir node and all nodes are connected to the reservoir node. In an exemplary embodiment, a few nodes that correspond to documents that are known to be authoritative or of high quality are selected as reference nodes. The reservoir node is connected to the reference nodes through a pump that maintains necessary flow of quality points in the nodal network.

The method assumes that the amount of quality point that flow along a link is proportional to the difference between the rank values of the source node and the destination node. The rank values of regular nodes are obtained by applying predetermined rank values to the reference nodes, and requiring the total amount of quality points flowing into a node to be equal to the total amount of quality points flowing out of the node. The quality score of a document is obtained as a quantity proportional to the rank value of a corresponding node.

DETAILED DESCRIPTION OF EXEMPLARY EMBODIMENTS

Embodiments of the present invention provide a method for assigning relative rank to a collection of linked documents, such as web pages in the World Wide Web. In exemplary embodiments, relative rank values are assigned to documents by analyzing the flow of quality points in a modeled nodal network that is constructed according to a connectivity graph of a linked database under consideration. The nodal network is constructed by adding one node for each document in the collection and one link for each hyperlink between two documents in the collection.

Search Engine Architecture

For conciseness, embodiments of the present invention are described as a part of a search engine that collects, stores, indexes, and assigns rank values to a collection of web pages in response to search queries. However, one of ordinary skill in the art will understand after review of the specification that embodiments of the present invention may be used in any linked database structure.

Figure 1:
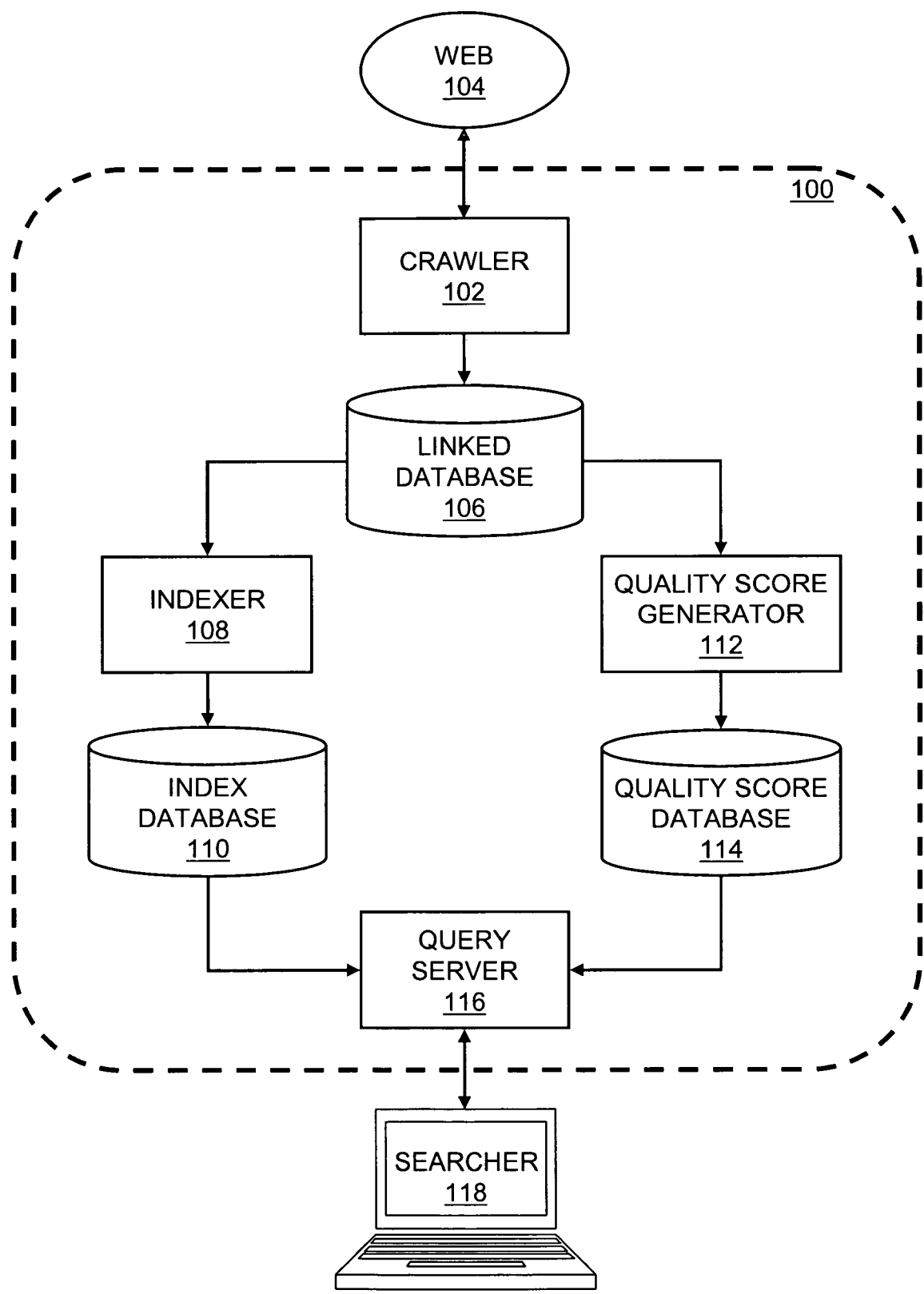
FIG. 1 is a diagram of an embodiment of an exemplary architecture of a search engine.

FIG. 1 illustrates an exemplary architecture in which embodiments of the present invention may be practiced. The architecture comprises a search engine 100. The search engine 100 comprises a crawler 102 configured to fetch web pages from the Web 104 or any other coupled network. In an exemplary embodiment, the search engine 100 is programmed in Java, runs on a Linux operating system, in parallel using suitable Intel Pentium processors. However, it is not necessary to embodiments of the present invention that this hardware and operating system combination be used, and other hardware and operating systems such as UNIX or Microsoft Windows XP may be used. In some embodiments, multiple instances of the crawler 102 run to increase capacity of the search engine 100 to retrieve hypertext document collections such as web pages on the Web 104. The crawler 102 stores retrieved web pages in a linked database 106, which comprises data structures optimized for fast access.

The exemplary search engine 100 is configured to provide an indexing function. Accordingly, the search engine 100 further comprises an indexer 108 and an index database 110. The exemplary indexer 108 assigns a unique document identification number (DIN) to each document in the linked database 106. The indexer 108 may further parse keywords from documents and generates a list of keyword-DIN pairs. For each keyword, the indexer 108 then collects a list of DINs for all documents that contain the keyword. The index database 110 stores the DINs list for fast retrieval.

The search engine 100 further comprises a quality score generator 112 and a quality score database 114. The exemplary quality score generator 112 is configured to assign relative quality scores to all documents. The quality score generator 112 reads a link structure from the linked database 106 and employs a method according to exemplary embodiments of the present invention to compute quality scores for documents in a linked database as fully described in connection with FIG. 8 below. The quality score generator 112 stores results in the quality score database 114 which is used by a query server 116.

One goal of the search engine 100 is to respond to a search query with search results in an order of relevancy. When the query server 116 receives a query (e.g., a keyword or set of keywords) from a search engine user or searcher device 118, the query server 116 collects all documents associated with the given query from the index database 110. The exemplary query server 116 generates a content score of each document from intrinsic content information (e.g., frequency at which query terms appear in the document, font size, and position of the query terms). In one embodiment, a higher content score is given if the query terms are in a title of the document.

The query server 116 combines the content score and the quality score to determine a relevancy score of each document to a given query. In an exemplary embodiment, the relevancy score of a document to a query is calculated by taking a harmonic mean of the content score and the quality score:

$$R(i, q) = \frac{C(i, q)S(i)}{C(i, q) + S(i)},$$

where $C(i, q)$ is the content score of document i for query q and $S(i)$ is the quality score of document i. The query server 116 then sorts the results according to the relevancy score and presents most relevant documents. (e.g., ten at a time) to the search engine user or searcher device 118.

In an exemplary embodiment, some steps for relevancy score evaluation are performed in advance to reduce response time of the query server 116. For example, the complete relevancy scores for single-word queries may be processed in advance. The query server 116 uses stored relevancy scores not only to respond immediately to single-word queries but also to combine them in a systematic way to construct the relevancy scores of multi-word queries.

Nodal Network Representation of a Linked Database

Embodiments of the present invention relate to a method for assigning relative rank values to documents in a linked database. For purposes of illustration, embodiments of the present invention are described using a nodal network that represents a physical system equivalent to an electrical circuit. Examples of alternative physical systems that may be classified as a nodal network will be described later. One of ordinary skill in the art will understand that any implementation of the invention based on a system that can be classified as a nodal network is within the scope of embodiments of the present invention.

Figure 2:
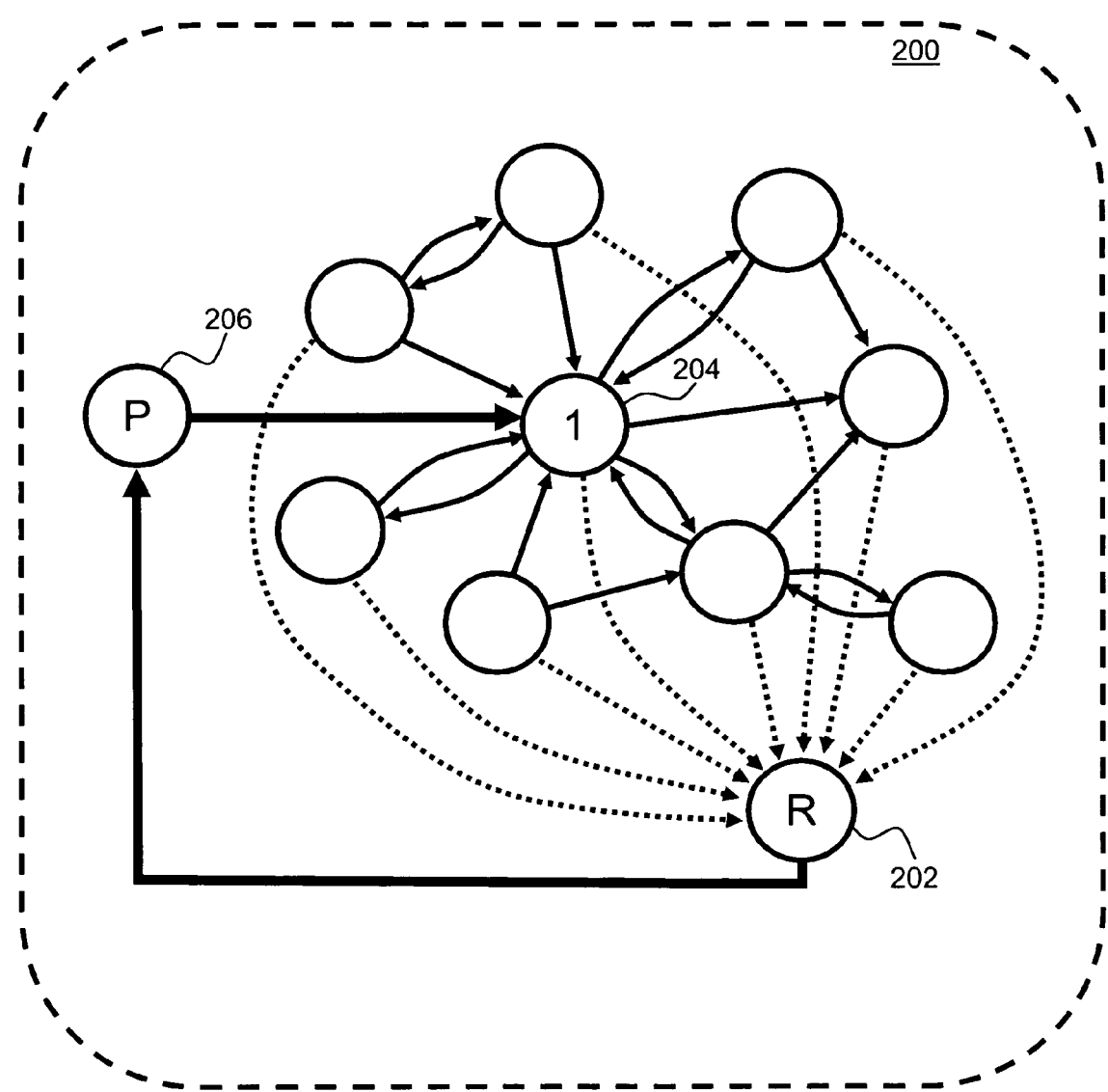
FIG. 2 is a diagram of an exemplary nodal network representing a collection of linked documents.

FIG. 2 illustrates an exemplary graphic representation of a nodal network 200 of a linked database 106 (e.g., Web or other hypermedia archive). One node (i.e., circle) is provided for each document and one link (i.e., arrow) is provided for each hyperlink in the database. In FIG. 2, a reservoir node is represented by an object 202, while a reference node is represented by object 204 and a quality point pump is represented by object 206. Each of these nodes and pump will be discussed in more detail infra.

Figure 3:
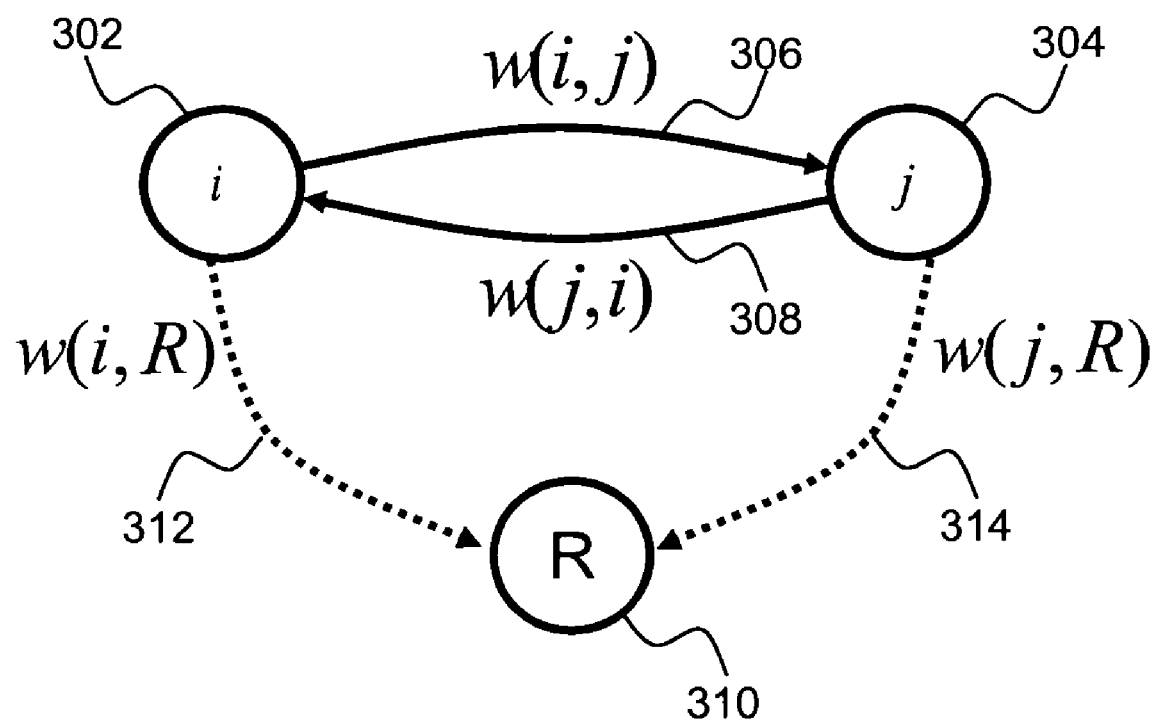
FIG. 3 is a detailed view of a nodal network around two nodes and links including connections to the reservoir node.

FIG. 3 is a detailed view of a nodal network around two nodes. Node i (object 302) and node j (object 304), represent the documents with DINs i and j. The inter-nodal link 306 represents a hyperlink from node i (object 302) to node j (object 304), while the inter-nodal link 308 represents a hyperlink from node j (object 304) to node i (node 302). In the present embodiment, a source node for a link is the node that the link originates from while a destination node for a link is the node that the link terminates at. For the hyperlink 306, node i (object 302) is the source node, and node j (object 304)

is the destination node. FIG. 3 also illustrates a reservoir node (object 310). The inter-nodal link 312 represents the additional link from node i (object 302) to the reservoir node (object 310). Similarly, the inter-nodal link 314 represents the additional link from node j (object 304) to the reservoir node (object 310).

Circulation of Quality Points

In exemplary embodiments of the present invention, a rank value is assigned to each node in a nodal network and a fixed amount of "quality points" circulate in a nodal network through inter-nodal links. Quality points are hypothetical objects that move around in a nodal network according to the link structure of the nodal network and distribution of rank values of nodes, analogous to charges in an electrical circuit or water in a system of water pipes. The flow of quality points from one node to another node is determined by the relative rank values of two nodes. The quality point flows from a node with a higher rank value to a node with a lower rank value. The amount of quality points flowing through a link per unit time is proportional to the difference of the rank values of the source node and the destination node. The situation is analogous to electric charges flowing in an electrical circuit or water circulating in a network of closed pipes.

In exemplary embodiments, an inter-nodal link in a nodal network allows quality points to flow only in one direction, from the source node to the destination node, analogous to an electrical connection with a diode or a water pipe with a check valve. Therefore, the quality points flow through a link only when the source node has a higher rank value than the destination node.

In an exemplary embodiment, an extra node is added to a nodal network as a "reservoir node." In FIG. 2, the reservoir node is represented by the object 202. The reservoir node does not correspond to an actual document in the database 106. The reservoir node is analogous to ground or common in an electrical circuit. In exemplary embodiments, one additional link from each node to the reservoir node is added to the nodal network 200. In FIG. 2, these additional links are represented as the dotted arrows connecting all nodes to the reservoir node 202. The reservoir node is given a predetermined minimum rank value (such as zero). Therefore, quality points flowing from nodes with higher rank values to nodes with lower rank values eventually all flow into the reservoir node. One of ordinary skill in the art will understand after review of the specification that embodiments of the present invention without using the reservoir node and/or the extra links to the reservoir node is possible, but it is still within the scope of the present invention.

In exemplary embodiments, a few documents that are known to be authoritative or of high quality, such as the homepage of CNET.com are selected as reference documents and their corresponding nodes are designated as reference nodes (e.g., object 204 with label "1" in FIG. 2). In exemplary embodiments, the database of these reference nodes are stored as a part of a search engine and updated regularly to reflect the current perception of the Internet users.

The circulation of quality points in a nodal network is completed by connecting the reservoir node to reference nodes via a quality point pump (object 206 with label "P" in FIG. 2). The reference nodes are given predetermined rank values (such as 100) and they serve as the entry points for quality point circulation while the reservoir node serves as an exit point. In exemplary embodiments, the predetermined rank values assigned to the reference nodes are uniform. In other exemplary embodiments, the predetermined rank values assigned to the reference nodes depend on the classification of the corresponding documents. A quality point pump, analogous to a battery in an electrical circuit or a water pump in a water pipe system, can make the quality points to flow against the rank value increase, going from the reservoir node with the minimum rank value to the reference nodes with higher rank values.

Flow of Quality Points

Furthermore, FIG. 3 illustrates a detailed view of a nodal network near node i and node j. Link i→j (object 306) represents the hyperlink from the source node i (object 302) to the destination node j (object 304), and it has a weight $w(i, j)$. Both node i and node j are connected to the reservoir node (object 310) via additional links 312 and 314 with weights $w(i, R)$ and $w(j, R)$, respectively. The amount of quality points that flow from node i to node j per unit time, $q(i, j)$, is proportional to the difference of rank values of the source and the destination node of the link:

$$q(i,j) = c(i,j) \cdot [V(i) - V(j)] \quad (1)$$

Here $V(i)$ is the rank value of node i, while $V(j)$ is the rank value of node j. The constant of the proportionality $c(i, j)$ is a "conductance" of the link from node i to node j. The conductance of an inter-nodal link determines how easily quality points flow through the link for a given rank value difference. For the same rank value difference, a link with higher conductance will carry more flow of quality points than a link with lower conductance.

In exemplary embodiments, an inter-nodal link in a nodal network allows quality points to flow only in one direction, from the source node to the destination node, analogous to an electrical connection with a diode or a water pipe with a check valve. This one-way flow of quality points in a link is expressed in terms of the conductance of the link:

$$c(i,j) = w(i,j) \text{ if } V(i) > V(j),$$

or $$c(i,j) = 0 \text{ if } V(i) \leq V(j), \quad (2)$$

where $w(i, j)$ is the weight of the link from node i to node j. A link is open only when the source node has a higher rank value than the destination node, or closed otherwise.

The weight of a link quantifies the importance of the corresponding hyperlink. In an exemplary embodiment, all links originating from a single node are given the same weight. In another embodiment, each link can be given a different weight depending on several factors such as an offset of the hyperlink (e.g., position on the document) and a size of a paragraph where the hyperlink is located. In another embodiment, a hyperlink readily visible upon loading of a document may be given a higher weight than a hyperlink visible only after scrolling down. In yet another embodiment, different weights can be assigned to external links (e.g., links that point to documents in a different site), and to internal links (e.g., links that point to documents in the same site). If there is no link from one document to another, the corresponding weight is zero.

Determination of Rank Values

In exemplary embodiments, the rank values of nodes in a nodal network are obtained by requiring quality points to obey the rule of "conservation of quality points": the quality points cannot be added or removed at any node or links during circulation. This rule of conservation not only makes the total amount of quality points circulating in a nodal network to be constant, but also requires that the total amount of quality points that flow into a node must be equal to the total amount of quality points that flow out of the node:

$$Q_{in}(i) = Q_{out}(i) \tag{3}$$

where $Q_{in}(i)$ is the total incoming quality points that flow into node i $$Q_{in}(i) = \sum_j q(j, i), \tag{4a}$$

and $Q_{out}(i)$ is the total outgoing quality points that flow out of node i $$Q_{out}(i) = \sum_j q(i, j). \tag{4b}$$

The second sum includes extra links to the reservoir node.

Unless the rank values of all nodes are set in a self-consistent manner, the rule of conservation will not be satisfied in general. Exemplary embodiments of the present invention provide procedures to adjust the rank values of all nodes in a nodal network so that the circulation of the quality points may be established without violating the rule of conservation at any point in the network.

In an exemplary embodiment, one can obtain a compact expression for the rank value of node i in terms of the rank values of its neighboring nodes by combining Eqs. (1) through (4):

$$V(i) = \frac{\sum_j c(i, j)V(j) + \sum_j c(j, i)V(j)}{\sum_j c(i, j) + \sum_j c(j, i)} \tag{5}$$

In another embodiment, instead of balancing the total amount of quality points flowing in and out of each node, the same rank values can be obtained by minimizing a quantity, analogous to total electrical power (i.e., energy output per unit time) of the network, given by $$P = \sum_{i,j} c(i, j)(V(i) - V(j))^2 \tag{6}$$

The equivalence of Eq. (6) and Eq. (3) can be established by deriving Eq. (3) from Eq. (6). For this end, the derivative of the power with respect to a rank value is obtained:

$$\frac{\partial P}{\partial V(k)} = 2 \sum_{i,j} c(i, j)(V(i) - V(j)) \left( \frac{\partial V(i)}{\partial V(k)} - \frac{\partial V(j)}{\partial V(k)} \right)$$

Since, $$\frac{\partial V(i)}{\partial V(k)} = \delta_{ik}$$

and $$\frac{\partial V(j)}{\partial V(k)} = \delta_{jk}$$

where $\delta_{ik}$ is the Kronecker delta function:

$$\delta_{ik} = 1 \text{ if } i=k,$$

or $$\delta_{ik} = 0 \text{ if } i \neq k,$$

Therefore, $$\frac{\partial P}{\partial V(k)} = 2 \left[ \sum_{i,j} c(i, j)(V(i) - V(j))\delta_{ik} - \sum_{i,j} c(i, j)(V(i) - V(j))\delta_{jk} \right] \tag{7}$$

$$= 2 \left[ \sum_j c(k, j)(V(k) - V(j)) - \sum_i c(i, k)(V(i) - V(k)) \right]$$

$$= 2[Q_{out}(k) - Q_{in}(k)]$$

The minimum of P is found by setting $$\frac{\partial P}{\partial V(k)} = 0.$$

Therefore, Eq. (7) reduces to Eq. (3).

Numerical Computation of Rank Values

Figure 4:
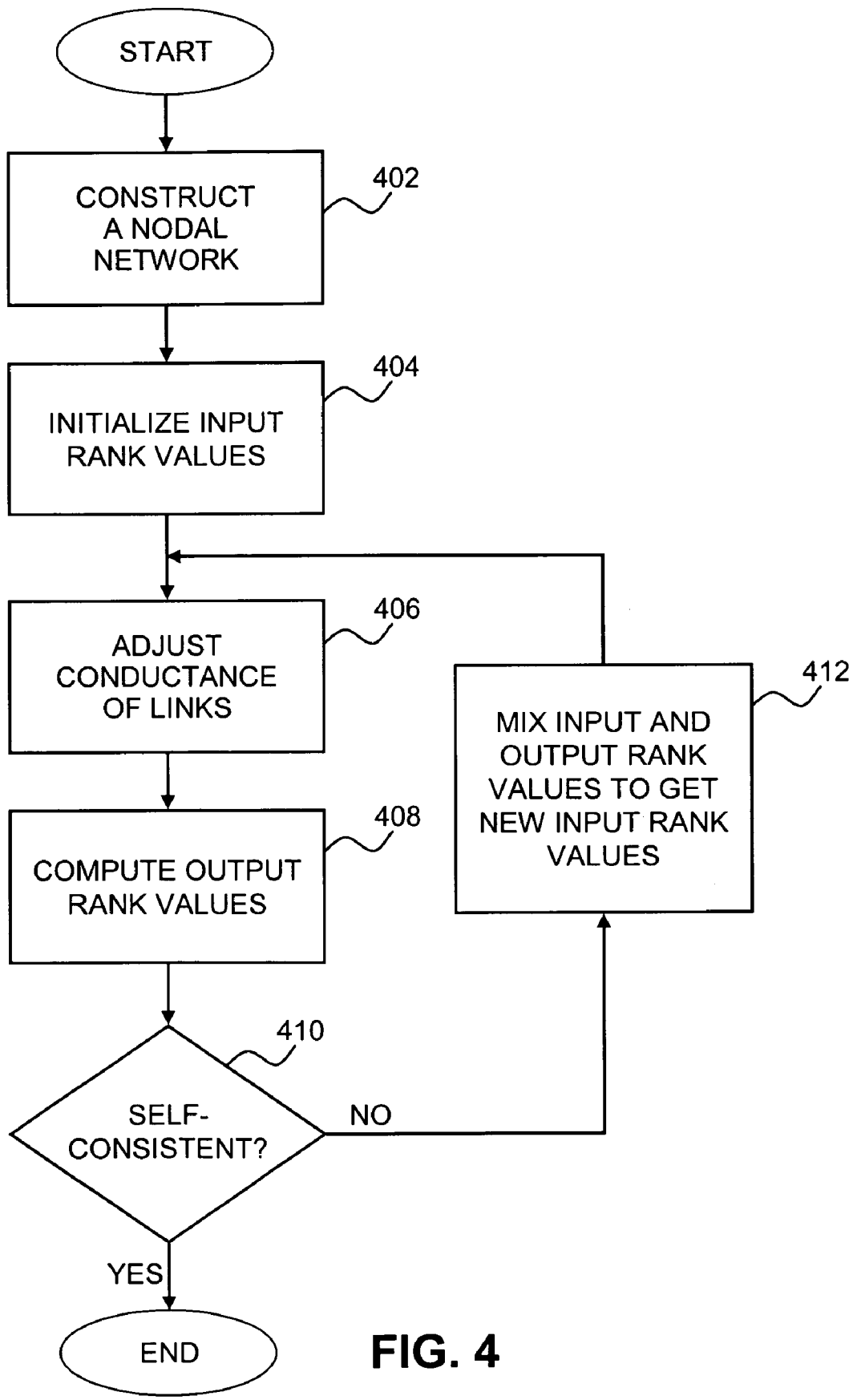
FIG. 4 is a flowchart of an exemplary method for generating rank values of nodes in a nodal network by a quality score generator of the search engine.

In exemplary embodiments, numerical methods are used to obtain self-consistent rank values throughout the nodal network. FIG. 4 shows a flowchart of an exemplary method for obtaining rank values of nodes. In exemplary embodiments the method of FIG. 4 is performed by the quality score generator 112. In an exemplary embodiment, a nodal network that corresponds to a linked database is constructed or modeled in step 402. In exemplary embodiments, the nodal network construction or modeling is based on data from the linked database 106.

In step 404, the quality score generator 112 initializes the input rank values $\{V(i)\}^{(1)}$. In an exemplary embodiment, the quality score generator 112 sets the rank values of the reference nodes to predetermined rank values such as 100, the rank value of the reservoir node to a predetermined minimum value such as zero, and the rank values of the regular nodes to an intermediate value such as 50. The rank values of reference nodes and reservoir node determine the range of rank values, but particular values used for initializing regular nodes do not make difference in the final rank values of nodes after the method of FIG. 4 is completed. The quality score generator 112 solves Eq. (3), or equivalently Eq. (5), iteratively. For iteration step n, the conductance of inter-nodal links, $\{c(i,j)\}^{(n)}$, is adjusted based on the input rank values $\{V(i)\}^{(n)}$ using Eq. (4) in step 406. In step 408, the output rank values $\{\tilde{V}(i)\}^{(n)}$ are obtained from a slightly modified version of Eq. (5) using the given input rank values $\{V(i)\}^{(n)}$ and the conductance values $\{c(i, j)\}^{(n)}$ $$\tilde{V}^{(n)}(i) = \frac{\sum_j c^{(n)}(i, j)V^{(n)}(j) + \sum_j c^{(n)}(j, i)V^{(n)}(j)}{\sum_j c^{(n)}(i, j) + \sum_j c^{(n)}(j, i)}. \tag{8}$$

In step 410, self-consistency of the output rank values is examined. In exemplary embodiments, self-consistency of rank values is measured by the sum of the magnitudes of the difference of the total incoming quality points and the total outgoing quality points on all nodes:

$$\delta = \sum_i |Q_{in}(i) - Q_{out}(i)|. \quad (9)$$

The quantity δ is zero when the output rank values of all nodes are the exact solution of Eq. (3). In general, however, the quantity δ will be a finite positive number and it gets smaller as the output rank values approach the exact solution in the course of iteration. If the output rank values are sufficiently self-consistent (the quantity δ is smaller than a predetermined tolerance value), the iteration stops. If the output rank values are not sufficiently self-consistent, the quality score generator 112 mixes the out rank values $\{\tilde{V}(i)\}^{(n)}$ with the input rank values $\{V(i)\}^{(n)}$ to construct a new input rank values for the next iteration $\{V(i)\}^{(n+1)}$ in step 412. The method then returns to step 406 and repeats until the output rank values become sufficiently self-consistent.

In exemplary embodiments of step 412, the quality score generator 112 combines the input and output rank values using a method called "simple mixing":

$$\{V(i)\}^{(n+1)} = (1-\alpha)\{V(i)\}^{(n)} + \alpha\{\tilde{V}(i)\}^{(n)}. \quad (10)$$

where α is a constant parameter between 0 and 1, and determines the ratio of output and input rank values during mixing. In exemplary embodiments, α value of 0.2 gives a good convergence. In another embodiment, in step 412, the quality score generator 112 uses more elaborate methods such as the extended Anderson Mixing method as is known to one skilled in the art.

A Simple Example

Figure 5:
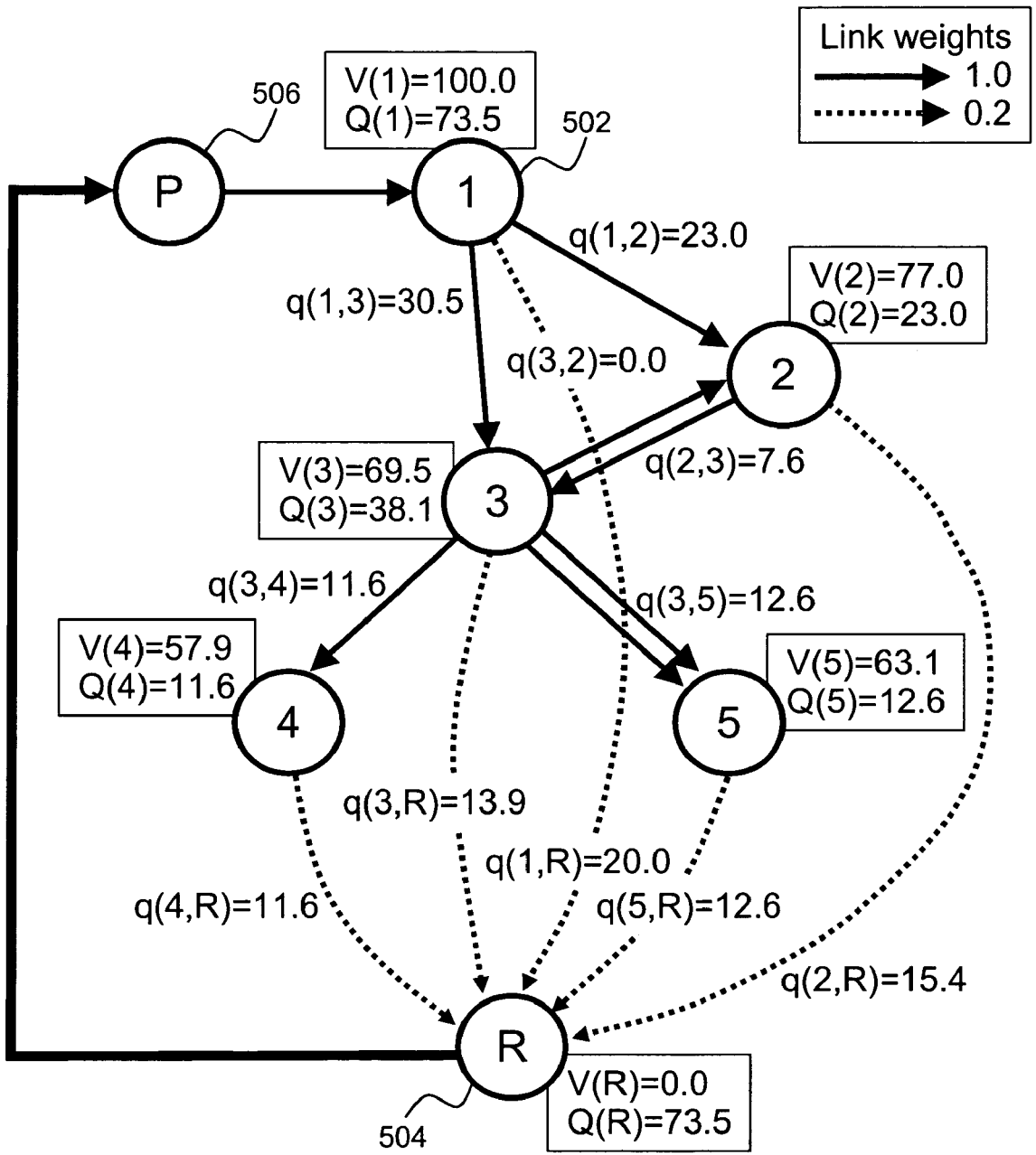
FIG. 5 is a diagram of a simple exemplary nodal network showing the rank values of nodes and quality points of links obtained using one of the embodiments of the present invention.

FIG. 5 is a diagram of an exemplary nodal network according to one embodiment of the present invention. The method of FIG. 4 may be applied to compute the rank values so that the rule of conservation is satisfied everywhere in the network. Node 1 (object 502) is a reference node and its rank is fixed to 100. Node R (object 504) is the reservoir node and its rank value is fixed to zero. The circulation of quality points is completed by connecting the reservoir node (object 504) to the reference node (object 502) through a quality point pump (object 506). In this particular example, all regular links (solid arrows) have the same weight of 1.0, while the links to reservoir (dotted arrows) have a lower weight of 0.2.

The amount of quality points flowing through the link from node 1 to node 3 is obtained from the rank values of node 1 and node 3 by using Eqs. (1) and (2). First, the conductivity of the link 1→3 is equal to the weight of the link (c(1,3)=w(1,3) =1.0) as specified in Eq. (2), since the source node has a higher rank value (V(1)=100.0) than the destination node (V(3)=69.5). Therefore the amount of quality points that flow from node 1 to node 3 is q(1,3)=c(1,3)*(V(1)−V(3))=(1.0)* (100.0−69.5)=30.5. On the other hand, the amount of quality point that flow from node 3 to node 2 is zero, as prescribed by Eq. (2), because the source node (node 3) has a lower rank value (V(3)=69.5) than the destination node (V(2)=77.0). As required by the rule of conservation, the total incoming quality points to node 3, Qin(3)=q(1,3)+q(2,3)=30.5+7.6=38.1, is equal to the total outgoing quality points out of node 3, Qout(3)=q(3,2)+q(3,4)+q(3,5)+q(3,R)=0.0+11.6+12.6+ 13.9=38.1. All quality points drained to the reservoir node are injected back into the system by the quality point pump (object 506) and directed to the reference node. This is demonstrated by the fact that the total incoming quality points to reservoir node is equal to the total outgoing quality points from node 1, Q(R)=73.5=Q(1).

Quality Scores of Documents

Once the rank values of nodes are determined, the quality score generator 112 assigns quality scores to corresponding documents. In an exemplary embodiment, the quality score generator 112 defines the quality score of a document as a quantity proportional to the rank value of the corresponding node:

$$S(i) = V(i). \quad (11a)$$

In another exemplary embodiment, the quality score generator 112 defines the quality score of a document as a quantity proportional to the total amount of quality points that flow through the corresponding node:

$$S(i) = Q(i). \quad (11b)$$

The quality score generator 112 stores the results in the quality score database 114.

Group Quality Score

A group quality score is a relative quality score for a group of documents, such as a website. The group quality score is computed by dividing the documents into groups of documents and treating the groups as units of computation. The group quality score is computed using a method similar to the one used for quality scores of individual documents. In an exemplary embodiment, one node per each group is created in a nodal network. Then, all hyperlinks from one group to another group (i.e., the links from all documents that belong to the first group to those that belong to the second group) are collapsed to a single link that has a weight corresponding to the sum of the weights of all individual links from the first group to the second group. Furthermore, a node corresponding to a group that contains one or more reference documents becomes a reference node. Once a new nodal network is constructed, the group rank values can be obtained by following the same procedure described above for the rank values of individual documents.

Topic-specific Quality Scores

Embodiments of the present invention can be used for assigning topic-specific, rather than general-purpose, quality scores to documents in a linked database. In an exemplary embodiment, a set of highly respected authoritative documents in a given topic is chosen as the reference documents. Then, the topic-specific quality scores are obtained by following the same procedure used for the general-purpose quality scores. For example, search engines specializing on shopping, such as the BECOME.com search engine, can use embodiments of the present invention to assign "shopping quality scores" to documents in a linked database. In this case, websites such as Amazon's website and CNET's website serve well as reference documents. Embodiments of the present invention can be applied to many different topic areas, such as medicine, sport, news, science, history, travel and so forth.

Spamming Score

Embodiments of the present invention can also be used for many other purposes. For example, an exemplary embodiment may be used to actively identify and penalize documents and their associated documents that employ spamming practices. A spamming (or negative quality) score may be computed in the following way. First, general-purpose rank values for a nodal network corresponding to a linked database are obtained by following the method described above. Next, conductance of inter-nodal links are set according to Eq. (2) based on the rank values. A set of well-known spamming sites are identified, and corresponding nodes are selected as new reference nodes and the rank values of these nodes are set to predetermined values, such as 100. The rank values of other nodes are obtained without further adjustment of the conductance of inter-nodal links.

When high rank values are imposed on the new reference nodes associated with the known spamming sites, all sites and web pages tightly connected to these spamming sites will attain high rank values. As it is generally the case for today's Internet, these spamming sites tend to form tightly knit communities and be very well connected to each other with thousands or millions of links among them. Therefore, embodiments of the present invention provide a very reliable and efficient mechanism to identify and penalize spamming sites.

Equivalent Systems

The flow of quality points in a nodal network can be described using many equivalent physical systems. One of ordinary skills in the art will recognize that many variations and alterations using one or more of these equivalent systems are within the scope of embodiments of the present invention. A few of such equivalent systems are presented in this section.

In an electrical circuit, electrical charges and potentials correspond to quality points and rank values of a nodal network, respectively. A fixed amount of charges circulate in a circuit through electrical connections by applying a predetermined potential to one or more junctions. The flow of charges from one junction to another junction is determined by the relative values of the potentials (voltage) of the two junctions. The charges flow from a junction with a higher potential to a junction with a lower potential. The amount of charges flowing through a connection per unit time (current) is proportional to the difference of the potentials (voltage) of the source junction and the destination junction. This relationship is commonly known as "Ohm's law" in the field. Each hyperlink is represented by a diode that allows charges to flow only in one direction, from the source junction to the destination junction. Electrical charges are the conserved quantities. The total amount of charges flowing into a junction per unit time is equal to the total amount of charges flowing out of a junction per unit time. The equation expressing this rule of conservation, analogous to Eq. (3), is commonly known as the Kirchhoff's equation. The potentials of the junctions in a circuit are obtained by solving the Kirchhoff's equation.

In a system of water pipes, water and pressures correspond to quality points and rank values of a nodal network, respectively. A fixed amount of water circulates in a network of closed water pipes by applying a predetermined pressure to one or more junctions. The flow of water from one junction to another junction is determined by the relative values of the pressures of the two junctions. Water flows from a junction at a higher pressure to a junction at a lower pressure. The amount of water flowing through a pipe per unit time is proportional to the difference of pressures of the source junction and the destination junction. Each hyperlink is represented by a pipe with a check valve that allows water to flow only in one direction, from the source junction to the destination junction. The amount of water is the conserved quantity. The total amount of water flowing into a junction per unit time is equal to the total amount of water flowing out of a junction per unit time. The pressures at the junctions of a network are obtained by solving the equation that expresses this rule of conversation, analogous to Eq. (3).

In mechanical systems, forces and displacements correspond to quality points and rank values of a nodal network, respectively. A fixed amount of total force is transmitted through a network of elastic springs by applying a predetermined displacement to one or more junctions. The force transmitted by a spring from one junction to another junction is determined by the relative values of the displacements of the two junctions. A force is transmitted from a junction with a higher displacement to a junction with a lower displacement. The force transmitted through a spring is proportional to the difference of the displacements of the source junction and the destination junction. This relationship is commonly known as "Hooke's law" in the field. Each hyperlink is represented by a spring with a ratchet that allows a force to be transmitted only in one direction, from the source junction to the destination junction. Forces are the conserved quantities. The total force transmitted into a junction is equal to the total force transmitted out of a junction. The displacements at the junctions of a network are obtained by solving the equation that expresses this rule of conversation, analogous to Eq. (3) Embodiments of the present invention using the spring network are described in detail in U.S. patent application Ser. No. 11/318,193 filed on Dec. 23, 2005 and entitled "Method for Assigning Relative Rank values to a Collection of Linked Documents," the disclosure of which is incorporated by reference.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processors), and Storage medium.

The present invention has been described above with references to exemplary embodiments. It will be apparent to those skilled in the art that various modifications may be made and other embodiments may be used without departing from the broader scope of the present invention. Therefore, these and other variations upon the specific embodiments are intended to be covered by the present invention.

What is claimed is:

1. A method for assigning quality scores to documents in a linked database, the method comprising:
 constructing a nodal network stored in memory, the nodal network comprising: (1) a plurality of nodes that each correspond to a document, wherein one or more of the plurality of nodes are selected as reference nodes that correspond to authoritative documents; (2) unidirectional links connecting nodes that correspond to documents that are hyperlinked together, the unidirectional links originating at nodes that correspond to source documents and terminating at nodes that correspond to destination documents; (3) a reservoir node connected to each of the plurality of nodes by unidirectional links that terminate at the reservoir node; and (4) a quality point pump connected to the reservoir by a unidirectional link that terminates at the quality point pump, the quality point pump connected to each of the reference nodes by unidirectional links that terminate at the reference nodes, the quality point pump configured to circulate quality points through the nodal network;
 initializing input rank values such that reference node ranks are fixed as the highest rank, a reservoir node rank is fixed as the lowest rank, and each of the plurality of nodes have intermediary and unfixed ranks, wherein quality points flow from nodes having a higher rank to nodes having a lower rank when the nodes are connected by a unidirectional link that terminates at the node having the lower rank;

executing instructions using a processor to adjust quality point flow rates for the unidirectional links such that the number of quality points flowing into each node equals the number of quality point flowing out of each node; and computing a quality score for each node based on the number of quality points contained therein.

2. The method of claim 1, further comprising determining a classification for the documents.

3. The method of claim 2, wherein the initialized ranks of the plurality of nodes are dependent on classifications of the documents that corresponding thereto.

4. The method of claim 1, wherein the documents comprise hypermedia documents.

5. The method of claim 1, wherein the documents comprise web pages.

6. The method of claim 1, wherein the total number of quality points is fixed.

7. The method of claim 1, further comprising updating which of the plurality of nodes are selected as reference nodes.

8. The method of claim 1, wherein the quality point flow rates are related, at least in part, to differences of ranks between nodes that correspond to source documents and nodes that correspond to destination documents.

9. The method of claim 1, wherein a portion of the plurality of nodes is grouped.

10. The method of claim 9, wherein the portion is assigned a group ranking.

11. A computer readable storage medium having instructions embodied thereon, the instructions executable by a processor to perform a method for assigning quality scores to documents in a linked database, the method comprising:

constructing a nodal network stored in memory, the nodal network comprising: (1) a plurality of nodes that each correspond to a document, wherein one or more of the plurality of nodes are selected as reference nodes that correspond to authoritative documents; (2) unidirectional links connecting nodes that correspond to documents that are hyperlinked together, the unidirectional links originating at nodes that correspond to source documents and terminating at nodes that correspond to destination documents; (3) a reservoir node connected to each of the plurality of nodes by unidirectional links that terminate at the reservoir node; and (4) a quality point pump connected to the reservoir by a unidirectional link that terminates at the quality point pump, the quality point pump connected to each of the reference nodes by unidirectional links that terminate at the reference nodes, the quality point pump configured to circulate quality points through the nodal network;

initializing input rank values such that reference node ranks are fixed as the highest rank, a reservoir node rank is fixed as the lowest rank, and each of the plurality of nodes have intermediary and unfixed ranks, wherein quality points flow from nodes having a higher rank to nodes having a lower rank when the nodes are connected by a unidirectional link that terminates at the node having the lower rank;

executing instructions using a processor to adjust quality point flow rates for the unidirectional links such that the number of quality points flowing into each node equals the number of quality point flowing out of each node; and computing a quality score for each node based on the number of quality points contained therein.

12. The computer readable storage medium of claim 11, further comprising determining a classification for the documents.

13. The computer readable storage medium of claim 12, wherein the initialized ranks of the plurality of nodes are dependent on classifications of the documents that corresponding thereto.

14. The computer readable storage medium of claim 11, wherein the documents comprise hypermedia documents.

15. The computer readable storage medium of claim 11, wherein the documents comprise web pages.

16. The computer readable storage medium of claim 11, wherein the total number of quality points is fixed.

17. The computer readable storage medium of claim 11, further comprising updating which of the plurality of nodes are selected as reference nodes.

18. The computer readable storage medium of claim 11, wherein the quality point flow rates are related, at least in part, to differences of ranks between nodes that correspond to source documents and nodes that correspond to destination documents.

19. The computer readable storage medium of claim 11, wherein a portion of the plurality of nodes is grouped.

20. The computer readable storage medium of claim 19, wherein the portion is assigned a group ranking.

* * * * *